(12) United States Patent
Dorbes et al.

(10) Patent No.: US 9,065,853 B2
(45) Date of Patent: Jun. 23, 2015

(54) METHOD AND DEVICE FOR STORING ONLINE DATA

(75) Inventors: Guillaume Dorbes, Nozay (FR); Cyril Hue, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 1080 days.

(21) Appl. No.: 12/993,927

(22) PCT Filed: May 14, 2009
(Under 37 CFR 1.47)

(86) PCT No.: PCT/FR2009/050902
§ 371 (c)(1),
(2), (4) Date: Jun. 13, 2011

(87) PCT Pub. No.: WO2009/156629
PCT Pub. Date: Dec. 30, 2009

(65) Prior Publication Data
US 2012/0159092 A1    Jun. 21, 2012

(30) Foreign Application Priority Data
Jun. 2, 2008    (FR) .................................... 08 02990

(51) Int. Cl.
*G06F 13/00*    (2006.01)
*H04L 29/08*    (2006.01)

(52) U.S. Cl.
CPC ............ *H04L 67/16* (2013.01); *H04L 67/1097* (2013.01); *H04L 67/322* (2013.01); *H04L 67/2814* (2013.10); *H04L 67/2819* (2013.01)

(58) Field of Classification Search
CPC .............................. G06F 12/00; G06F 2212/00
USPC ................................................... 711/164, 170
See application file for complete search history.

(56) References Cited

U.S. PATENT DOCUMENTS 6,721,797 B1 *  4/2004  Kim .............................. 709/232
6,785,227 B1 *  8/2004  Lu et al. ....................... 370/229

(Continued)

FOREIGN PATENT DOCUMENTS

| CN | 1487423 | 4/2004 |
|----|---------|--------|
| CN | 1682185 | 10/2005 |
| CN | 101047610 | 10/2007 |

OTHER PUBLICATIONS

Office Action for Chinese Application No. 200980118757.X dated on Feb. 4, 2013.

(Continued)

*Primary Examiner* — Sean D Rossiter
(74) *Attorney, Agent, or Firm* — Harness, Dickey & Pierce, P.L.C.

(57) ABSTRACT

A method and device for reserving an online data storage space involving receiving a storage request containing a set of parameters including at least one parameter corresponding to a quality of service for storage, analyzing the set of parameters, creating, and sending to online data storage units, a reservation request corresponding to the set of parameters, receiving at least one reply to the reservation request corning from the online data storage units, selecting, among the replies received, an online storage unit as a function of all the parameters defined in the storage request, creating a reservation key enabling access to the selected storage space, sending the reservation key and the selected storage space address.

10 Claims, 3 Drawing Sheets

(56) References Cited

U.S. PATENT DOCUMENTS

| | | | |
|---|---|---|---|
| 6,795,860 B1 | 9/2004 | Shah | |
| 8,375,304 B2* | 2/2013 | Swenson et al. | 715/738 |
| 8,443,163 B1* | 5/2013 | Bailey et al. | 711/170 |
| 8,468,246 B2* | 6/2013 | Mays et al. | 709/226 |
| 8,560,777 B2* | 10/2013 | Meirosu et al. | 711/133 |
| 2003/0061338 A1* | 3/2003 | Stelliga | 709/224 |
| 2003/0188117 A1* | 10/2003 | Yoshino et al. | 711/164 |
| 2003/0204574 A1* | 10/2003 | Kupershmidt | 709/220 |
| 2004/0243692 A1* | 12/2004 | Arnold et al. | 709/220 |
| 2005/0114605 A1* | 5/2005 | Iyer | 711/133 |
| 2005/0268063 A1* | 12/2005 | Diao et al. | 711/170 |
| 2006/0015699 A1* | 1/2006 | Fujiwara et al. | 711/162 |
| 2006/0136548 A1* | 6/2006 | Nishio et al. | 709/203 |
| 2006/0230086 A1 | 10/2006 | Devarakonda et al. | |
| 2007/0174580 A1* | 7/2007 | Shulga | 711/170 |
| 2009/0043958 A1* | 2/2009 | Kaneda et al. | 711/112 |
| 2009/0113525 A1* | 4/2009 | Rajan et al. | 726/4 |
| 2009/0172315 A1* | 7/2009 | Iyer et al. | 711/158 |
| 2014/0013072 A1* | 1/2014 | Liu et al. | 711/170 |

OTHER PUBLICATIONS

International Search Report.

\* cited by examiner

| Quality of Service Parameters | Desired level |
|---|---|
|  |  |
| Uptime | 5 |
| Earthquake safety level | 1 |
| Performance level | 2 |
| Price | 5 |

FIG. 3

| Quality of Service Parameters | Desired level |
|---|---|
|  |  |
| Uptime | 1 |
| Earthquake safety level | 5 |
| Performance level | 5 |
| Price | 1 |

FIG. 4

METHOD AND DEVICE FOR STORING ONLINE DATA

FIELD OF THE INVENTION

The present invention relates to an online data storage method,

RELATED ART

In response to the universalization of digital equipment and the development of computer programs requiring a large amount of data, the demand for storage space is growing. This demand, combined with the ease of exchanging data that the Internet affords, has led to the development of online storage or backup spaces. However, within the state of the art, online storage solutions do not enable a large choice regarding the storage space's quality of service. There is a multitude of ordinary data storage solutions, but within the state of the art, these solutions are generally storage spaces located at a specific location and rented out by their owner, with the data exchange between the client and the storage space taking place in the form of a "peer-to-peer" transfer. Thus, the choice of storage parameters is limited, and the security of the data during its transfer is not checked. However, depending on the type and importance of data to be stored or backed up, the needs in terms of performance, safety of storage, or availability, for example, are not all the same.

SUMMARY OF INVENTION

The purpose of the present invention is therefore to resolve the aforementioned drawbacks of the state of the art and to propose an online data storage method with multiple storage spaces enabling the user to define the desired quality of service and to obtain the most appropriate solution for his or her needs from among the multitude of solutions offered by the network.

To that end, the invention pertains to a method for reserving an online data storage space, comprising:
  the receiving of a storage request containing a set of parameters including at least one parameter corresponding to a storage quality of service,
  the analyzing of said set of parameters,
  the creation, and transmission to online data storage units, of a reservation request corresponding to that set of parameters,
  the receiving of replies to the reservation request coming from the online data storage units,
  the selection, from among the replies received, of an online storage unit as a function of all the parameters defined within the storage request,
  the creation of a reservation key enabling access to the selected storage space,
  the transmission of both said reservation key and the address of the selected storage space.

According to one embodiment, said reservation key is encrypted.

According to another embodiment, the creation of a storage request comprises:
  an identifier of said request,
  a user identifier,
  defining the size of the storage space and the associated quality of service.

According to a complementary embodiment, said at least one parameter corresponding to an associated quality of service comprises at least one parameter from the following list:
  an availability criterion,
  a performance level,
  an earthquake safety level,
  a storage cost,
  a performance level.

According to another embodiment, the data exchanges are made secure by the use of a security protocol.

According to a complementary embodiment, the confidentiality of the data is ensured by the use of a cryptography program.

The present invention also pertains to a storage-allocation server comprising at least one processing means adapted for:
  the receiving of a storage request containing a set of parameters including at least one parameter corresponding to a storage quality of service,
  the analyzing of said set of parameters,
  the creation, and transmission to online data storage units, of a reservation request corresponding to that set of parameters,
  the receiving of at least one reply to the reservation request coming from the online data storage units,
  the selection, from among the replies received, of an online storage unit as a function of all the parameters defined within the storage request,
  the creation of a reservation key enabling access to the selected storage space,
  the transmission of both said reservation key and the address of the selected storage space.

It also pertains to a client terminal comprising at least one adapted processing means enabling:
  the creation of a storage request containing a set of parameters including at least one parameter corresponding to a storage quality of service,
  the transmission of said storage request to a storage allocation server,
  the receiving of both an storage space's address and a reservation key.

Additionally, the invention pertains to a storage agent comprising at least one adapted processing means enabling:
  the receiving of a reservation request,
  the searching for and reservation of storage spaces corresponding to the parameters contained within the reservation request, including at least one parameter corresponding to a storage quality of service,
  the transmission of at least one reply containing at least one piece of information on the selected storage space and the associated parameters, including said at least one parameter corresponding to a storage quality of service.

Other characteristics and benefits of the invention will become apparent from the following description, given with reference to the attached drawings, which by way of a non-limiting example depict one possible embodiment.

BRIEF DESCRIPTION OF THE DRAWINGS

In these drawings:
FIGS. 3 and 4 depict a table of required quality of service levels within 2 different storage requests;

DETAILED DESCRIPTION

Figure 1:
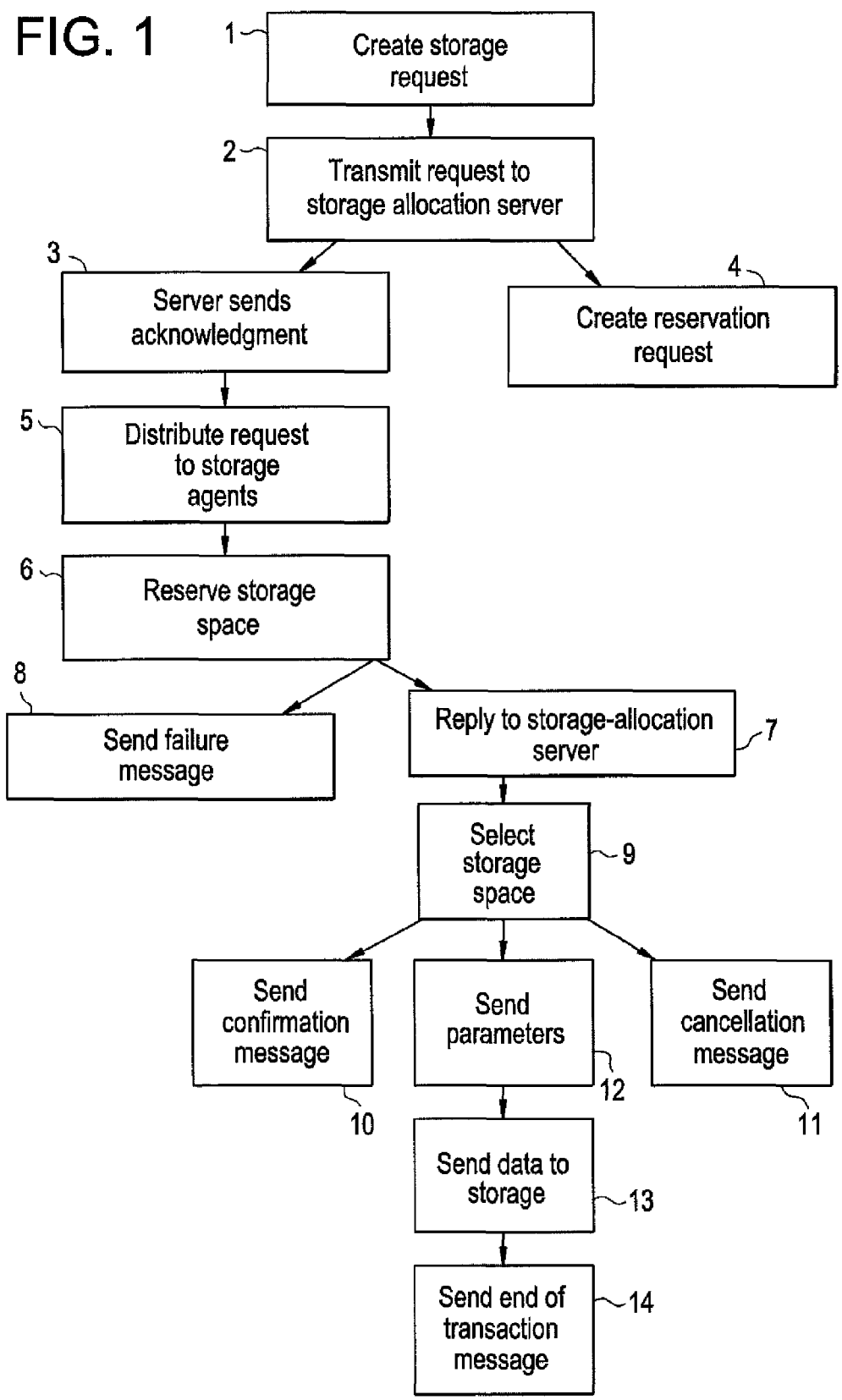
FIG. 1 is a flowchart depicting the various steps of the present invention.
Figure 2:
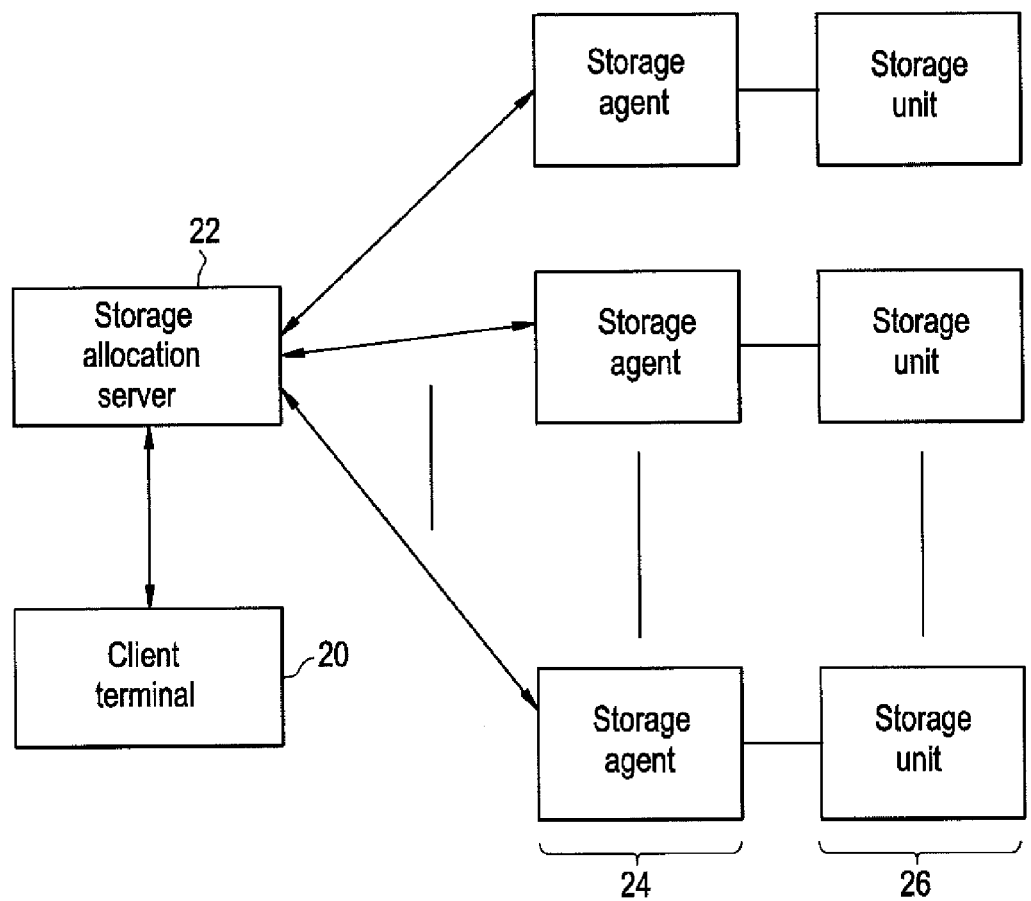
FIG. 2 is a diagram depicting the various elements of the present invention and their interactions.

The inventive method will now be described in greater detail with reference to the figures.

The inventive method begins by creating a storage request (step 1).

This request is created within the client terminal 20 and comprises at least the following parameters:
- an identifier of the request,
- a user identifier,
- the definition of the parameters related to data storage.

These parameters pertain not only to the space in memory needed to store the data, but also at least one parameter related to quality of service. These parameters may comprise, for example, a performance level (e.g. transfer rate), a level of uptime, an earthquake safety level, the cost of storage, a security level (double-storage or data image on another drive, etc.)

This storage request is then transmitted to a storage-allocation server 22 (step 2).

In order to enable optimal protection, the data exchanges may be made secure through the use of a security protocol such as a Secure Sockets Layer (SSL) protocol.

The storage-allocation server 22 then receives and analyzes the request's various parameters.

The storage-allocation server 22 then sends an acknowledgment of receipt message back to the client terminal summarizing the storage request (step 3).

This message comprises at least the following parameters:
- a server identifier,
- the request's identifier,
- a reservation code, Analyzing the storage request's parameters also leads to the creation of a reservation request (step 4) comprising at least the following parameters:
- a server identifier,
- a reservation code,
- the size of the data,
- the parameters corresponding to the required level of quality,
- service parameters.

The service parameters are additional parameters created by the allocation server and comprising, for example, a contract identifier, and a location or other parameter needed to search for the storage space.

This reservation request is then distributed to all of the storage agents 24 (step 5). These agents are assigned to storage units 26 comprising data storage spaces. These units do not require special equipment, so any storage unit connected to the Internet network may be used by the present invention.

The storage agents 24 then look for storage space corresponding to the request, and reserve these spaces if available (step 6).

For each storage space located, the storage agents 24 then send a reply back to the storage-allocation server 22 (step 7) comprising at least:
- the storage space's identifier,
- the storage space's address,
- an acceptance code for the storage request,
- the acceptance validity period,
- the reservation code.

If no storage space corresponds to the reservation request, a negative reply is sent back to the storage-allocation server 22.

If no positive replies are received by the storage-allocation server 22, a storage request failure message is sent back to the client terminal 20 (step 8).

Otherwise, the storage agents' various positive replies are received by the storage-allocation server 22. Data from the various replies are then processed so as to select the storage space that best matches the request (step 9). If two replies are equivalent, a priority criterion may be selected in order to refine the selection so as to obtain the optimal solution. The two replies may also be offered to the user so that he or she can choose on his or her own.

Once the optimal solution is obtained, a confirmation message is sent to the corresponding storage agent 24 (step 10).

This confirmation message contains at least the following parameters:
- the reservation code,
- a reservation key,
- the user identifier,
- the server identifier,
- an acceptance code for the storage request.

In parallel, a cancellation message is sent to the storage agents 24 whose replies were not selected (step 11).

The storage-allocation server 22 then sends back to the client terminal 20 a message (step 12) containing at least the following parameters:
- the selected storage space's address,
- the reservation key.

The use of a reservation key thereby enables the client terminal to directly send the data to the storage space (step 13), without there being any intermediaries.

This sending comprises at least the following parameters:
- the data to be stored,
- the reservation key, A cryptography protocol, such as the Pretty Good Privacy (PGP) protocol, makes it possible to ensure the confidentiality and security of the exchanged data.

The client terminal 20 then sends an end-of-transaction message to the storage-allocation server 22 (step 14).

In order to better understand the present invention, an example embodiment will now be described in the remainder of the description.

A user wishes to store both music files and important work documents. Thus, the qualities of service required for the two types of data are different.

With the present invention, the user can define two different qualities of service. First, for music files, he may, for example, define a standard level of security, but want a high uptime, as depicted in FIG. 3. For each quality of service parameter, the user selects a predefined level. Level 1 corresponds to the lowest level and level 5 the highest level. This, a level-5 uptime will mean that access is constantly available and that interruptions are nearly nonexistent. Conversely, level 1 will correspond to a low uptime. For the price, level 1 will mean that the cost is not a priority, while for level 5, the cost will be given weight over other parameters. In the present situation, the user prefers the uptime and price, and does not require an earthquake protection level or high performance. Thus, he or she will make a first storage request comprising these parameters. Additionally, for the important work files, he or she will want a maximum security level. A second storage request comprising parameters tailored to these needs as described in FIG. 4 will then be made. In this request, the earthquake safety level and desired performance are maximized, while the price and uptime are less important.

These storage requests are made by the user from his or her terminal 20 then sent to a storage-allocation server 22. This server analyzes the two storage requests. This analysis may lead to a selection of storage agents 24 to which a reservation request will be sent. If a high level of security is requested, as with the important work files in the present example, the server will only select the storage agents 24 of storage spaces which are likely to provide the requested service. Thus, analyzing the two storage requests leads to the creation of two corresponding reservation requests sent to two groups of storage agents selected by the storage-allocation server 22, each group depending on the chosen storage parameters.

The storage agents 24 receive the reservation request and search within the storage unit(s) 26 to which they are assigned, for the uptime of a storage space corresponding to the parameters of the reservation request.

If such a space is available, a reservation is made. This reservation is momentary, pending the confirmation from the storage-allocation server 22. The duration of this momentary reservation may, for example, be defined by the storage-allocation server 22 within the reservation request parameters.

A reply containing the reserved and available space is then sent back to the storage-allocation server 22. This server collects the replies from the various storage agents 24, then selects from among these replies the one most appropriate to the request. In the present example, the most appropriate storage space for the music files might, for example, be located in Asia, while the most appropriate space for the important work files might be located in Switzerland in an earthquake-proof shelter.

A confirmation is then sent to the storage agents 24 corresponding to the selected replies in order to permanently reserve the storage space. Likewise, a cancellation message is sent to the other storage agents 24 that sent back a reply. A reply to the storage request is then sent to the client terminal 20, comprising the addresses of the selected storage spaces and a key that may be encrypted allowing access to the storage space. The addresses may, for example, be Internet Protocol (IP) addresses corresponding to the storage spaces. The user may then directly send his or her data to the selected storage spaces.

Thus, the present invention enables a user to be able to select a quality of service corresponding to his or her needs, and by means of the storage-allocation server, to know which storage space best matches the selected criteria. Additionally, the present invention also enables a direct transfer of data from the client terminal to the selected storage space, thereby optimizing the security and confidentiality of the data.

The invention claimed is:

1. A method for reserving an online data storage space for storing user data from a user terminal of a user, comprising:
    receiving a storage request containing a set of parameters including at least one weighted parameter corresponding to a quality of service category for storage, the at least one weighted parameter including a user-selected weight value representing the importance of the quality of service category,
    analyzing said set of parameters,
    creating, and sending to online data storage units, a reservation request corresponding to said set of parameters,
    receiving at least one reply to the reservation request coming from the online data storage units,
    selecting, among the replies received, an online storage unit as a function of all the parameters defined in the storage request,
    creating a reservation key enabling access to the selected storage space,
    sending said reservation key and the selected storage space address,
    wherein the at least one weighted parameter corresponding to a quality of service category includes a monetary storage cost for the user,
    wherein the online data storage units can be accessed by the user terminal over an internet connection.

2. A method for reserving an online data storage space according to claim 1, wherein said reservation key is encrypted.

3. A method for reserving an online data storage space according to claim 2, wherein the creation of a storage request comprises:
    an identifier of said storage request,
    a user identifier,
    defining the size of the storage space and the associated quality of service.

4. A method for reserving an online data storage space according to claim 3 wherein said at least one parameter corresponding to an associated quality of service further includes at least one additional parameter from the following list:
    an availability criterion,
    a performance level,
    an earthquake safety level.

5. A method for reserving an online data storage space according to claim 1, wherein the data exchanges are made secure by the use of a security protocol.

6. A method for reserving an online data storage space according to claim 1, wherein the confidentiality of the data is ensured by the use of a cryptography program.

7. A storage-allocation server for storing user data from a user terminal of a user comprising at least one adapted processing means for:
    the receiving of a storage request containing a set of parameters including at least one weighted parameter corresponding to a storage quality of service category, the at least one weighted parameter including a user-selected weight value representing the importance of the quality of service category,
    the analyzing of said set of parameters,
    the creation, and transmission to online data storage units, of a reservation request corresponding to that set of parameters,
    the receiving of at least one reply to the reservation request coming from the online data storage units,
    the selection, from among the replies received, of an online storage unit as a function of all the parameters defined within the storage request,
    the creation of a reservation key enabling access to the selected storage space,
    the transmission of both said reservation key and the address of the selected storage space,
    wherein the at least one weighted parameter corresponding to a quality of service category includes a monetary storage cost for the user,
    wherein the online data storage units can be accessed by the user terminal over an internet connection.

8. A client terminal for a client comprising at least one adapted processing means enabling:
    the creation of a storage request containing a set of parameters including at least one weighted parameter corresponding to a storage quality of service category, the at least one weighted parameter including a user-selected weight value representing the importance of the equality of service category,
    the transmission of said storage request to a storage allocation server,
    the receiving of both an storage space's address and a reservation key,
    wherein the at least one weighted parameter corresponding to a quality of service category includes a monetary storage cost for the client, wherein the storage space can be accessed by the client terminal over an internet connection.

9. A storage agent for storing user data from a user terminal of a user comprising at least one adapted processing means enabling:
- the receiving of a reservation request,
- the searching for and reservation of storage spaces corresponding to the parameters contained within the reservation request, including at least one weighted parameter corresponding to a storage quality of service category, the at least one weighted parameter including a user-selected weight value representing the importance of the quality of service category,
- the transmission of at least one reply containing at least one piece of information on the selected storage space and the associated parameters, including said at least one parameter corresponding to a storage quality of service,
- wherein the at least one weighted parameter corresponding to a quality of service category includes a monetary storage cost for the user,
- wherein the selected storage space can be accessed by the user terminal over an internet connection.

10. A method for reserving an online data storage space for storing user data from a user terminal of a user, comprising:
- receiving a storage request containing a set of parameters including at least one weighted parameter associated with a quality of service category for storage, the at least one weighted parameter including a user-selected weight value representing the importance of the quality of service category,
- analyzing said set of parameters,
- creating, and sending to online data storage units, a reservation request corresponding to said set of parameters,
- receiving at least one reply to the reservation request coming from the online data storage units,
- selecting, among the replies received, an online storage unit as a function of all the parameters defined in the storage request,
- creating a reservation key enabling access to the selected storage space,
- sending said reservation key and the selected storage space address,
- wherein the at least one weighted parameter associated with the quality of service category includes a monetary storage cost for the user.

* * * * *